(12) United States Patent
Weber et al.

(10) Patent No.: US 10,837,389 B2
(45) Date of Patent: Nov. 17, 2020

(54) SYSTEM AND METHOD FOR DIAGNOSING MISFIRING OF A VARIABLE DISPLACEMENT ENGINE

(71) Applicant: Ford Global Technologies, LLC, Dearborn, MI (US)

(72) Inventors: Chris Weber, Plymouth, MI (US); John Rollinger, Troy, MI (US); Robert Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 15/882,911

(22) Filed: Jan. 29, 2018

(65) Prior Publication Data

US 2019/0234323 A1 Aug. 1, 2019

(51) Int. Cl.
*F02D 41/24* (2006.01)
*F02D 41/00* (2006.01)
*F02D 41/10* (2006.01)
*F02D 13/06* (2006.01)

(52) U.S. Cl.
CPC ......... *F02D 41/2432* (2013.01); *F02D 13/06* (2013.01); *F02D 41/0087* (2013.01); *F02D 41/10* (2013.01); *F02D 2200/1015* (2013.01)

(58) Field of Classification Search
CPC .... F02D 41/008; F02D 41/0087; F02D 41/10; F02D 41/2429; F02D 41/2432; G01M 15/11

USPC ............... 701/103, 104, 110, 111; 123/481; 73/114.02, 114.05, 114.24
See application file for complete search history.

(56) References Cited

U.S. PATENT DOCUMENTS

| | | | |
|---|---|---|---|
| 5,044,194 A * | 9/1991 | James | F02D 41/1497 73/114.05 |
| 7,086,386 B2 | 8/2006 | Doering | |
| 7,900,509 B2 | 3/2011 | Feldkamp et al. | |
| 8,919,097 B2 * | 12/2014 | Kerns | F02D 41/0087 123/198 F |
| 9,399,963 B2 * | 7/2016 | Loucks | F02D 41/0087 |
| 2014/0350823 A1 * | 11/2014 | Glugla | F02P 5/152 701/104 |
| 2015/0233289 A1 * | 8/2015 | Younkins | F02B 77/082 73/114.79 |
| 2016/0109330 A1 * | 4/2016 | Chen | F02D 35/024 73/114.05 |
| 2016/0116371 A1 | 4/2016 | Chen et al. | |

* cited by examiner

*Primary Examiner* — Erick R Solis
*Assistant Examiner* — Robert A Werner
(74) *Attorney, Agent, or Firm* — Geoffrey Brumbaugh; McCoy Russell LLP

(57) ABSTRACT

Systems and methods for determining the presence or absence of cylinder misfire of an internal combustion engine are presented. In one example, a threshold for establishing or denying the presence of cylinder misfire is determined via engine acceleration amounts of active and non-active cylinders. Engine acceleration values are then compared to the threshold to determine the presence or absence of cylinder misfire.

18 Claims, 8 Drawing Sheets

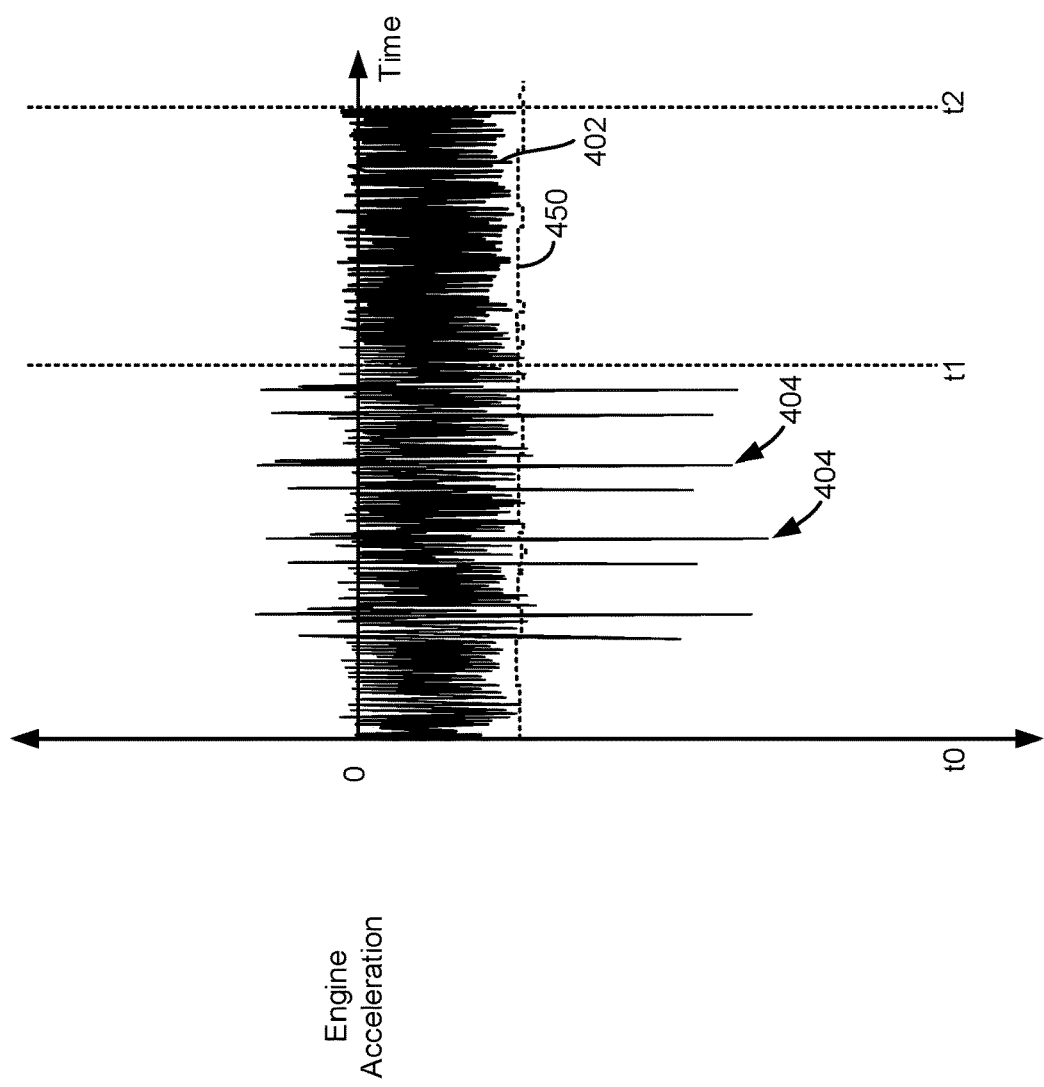

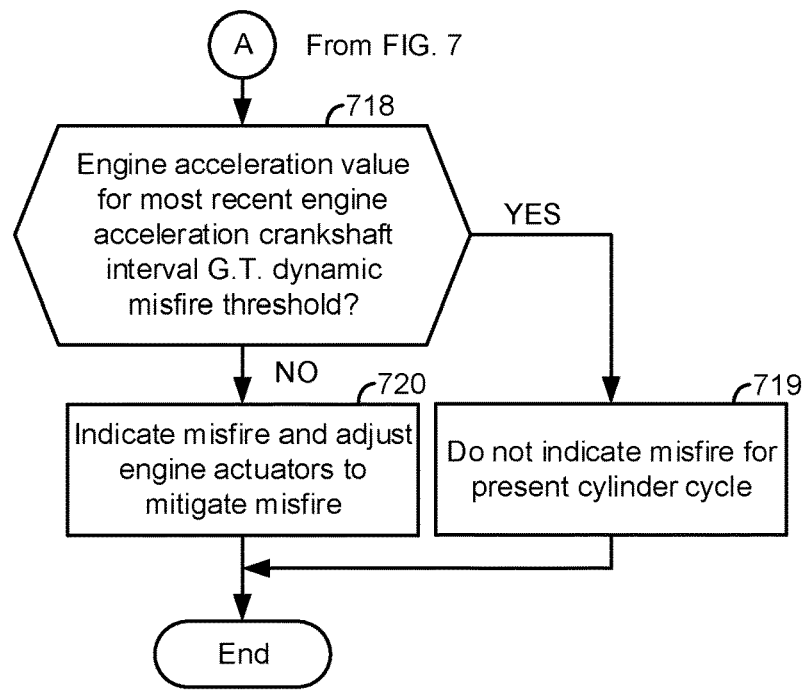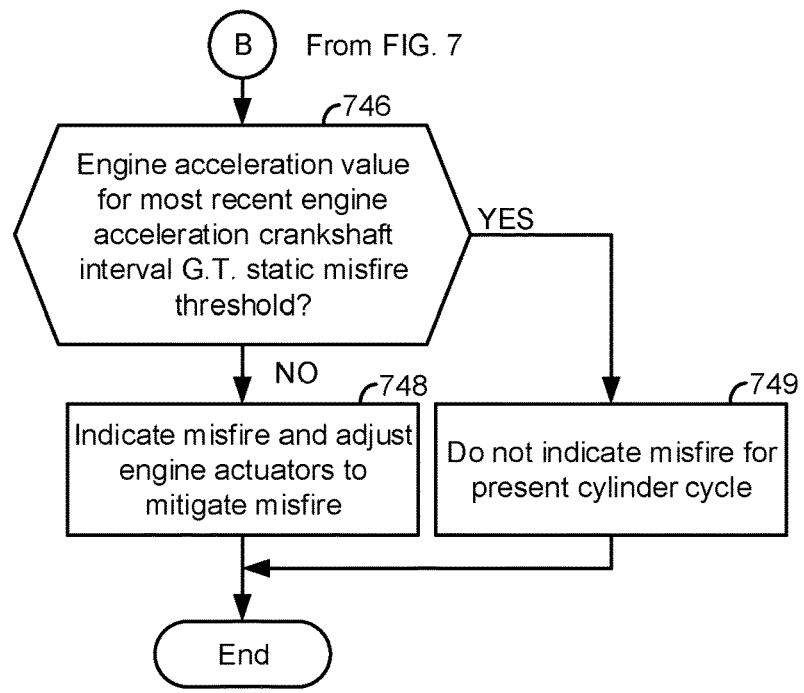
FIG. 8

US 10,837,389 B2

SYSTEM AND METHOD FOR DIAGNOSING MISFIRING OF A VARIABLE DISPLACEMENT ENGINE

BACKGROUND AND SUMMARY

Cylinders of an internal combustion engine may misfire from time to time such that fuel and air in a cylinder may not combust or may only partially combust during some vehicle operating conditions. The misfire may be caused by a lean air fuel mixture, insufficient spark energy, improper spark timing, improper fuel injection timing, or other conditions. If an air-fuel mixture within a cylinder does not combust, it may cause engine emissions to increase. If the engine frequently misfires, it may cause degradation of an engine after treatment system. One way to determine whether or not a misfire occurs in a particular cylinder is to evaluate engine acceleration during an expansion stroke of the particular cylinder. If the engine accelerates by less than a predetermined amount, it may be judged that the cylinder has misfired. If the engine accelerates more than the predetermined amount, it may be judged that the cylinder has fired properly.

The internal combustion engine may also include cylinder that may be selectively deactivated to conserve fuel while other cylinders continue to operate to propel a vehicle and to keep the engine rotating. The cylinders may be deactivated by holding intake and exhaust valves of deactivated cylinders in a closed state over an entire engine cycle (e.g., two revolutions for a four stroke engine). Efficiency of cylinders that remain activated increases by improving thermal efficiency and reducing engine pumping losses. However, a deactivated cylinder may reduce engine acceleration during an engine cycle such that it may be judged that the deactivated cylinder has misfired. Further, the deactivated cylinder may affect engine acceleration during an expansion stroke of a different activated cylinder such that it may be judged that the other cylinder has misfired. Therefore, it may be desirable to provide a way of more reliably determining the presence or absence of cylinder misfire in an engine that may deactivate cylinders from time to time.

The inventors herein have developed an engine operating method, comprising: indicating misfire in an engine cylinder, the indication of misfire provided in response to a magnitude of an engine acceleration value exceeding a threshold, the threshold being a function of a first group of parameters for activated cylinders and a second group of parameters for deactivated cylinders; and adjusting operation of a device in response to the indication of misfire.

By determining a threshold that is a basis for judging the presence or absence of cylinder misfire based on parameters for activated cylinders and parameters for deactivated cylinders, it may be possible for the threshold to dynamically change responsive to firing and non-firing cylinders so that the possibility of fewer false positive indications of cylinder misfire may be indicated. Further, by dynamically changing the threshold responsive to engine acceleration caused by activated cylinders and deactivated or non-activated cylinders, the bounds of the threshold may be adjusted specifically for the engine being evaluated for misfire.

The present description may provide several advantages. In particular, the approach may provide improved diagnostics for engine cylinder misfire. Additionally, the approach may be provided without additional hardware beyond the base engine hardware. Further, the approach may more reliably detect the presence or absence of cylinder misfire. Further still, the approach may provide greater signal to noise separation for detecting cylinder misfire.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows example engine acceleration levels and a static cylinder misfire threshold.

FIGS. 7 and 8 show a method for operating an engine.

DETAILED DESCRIPTION

Figure 1:
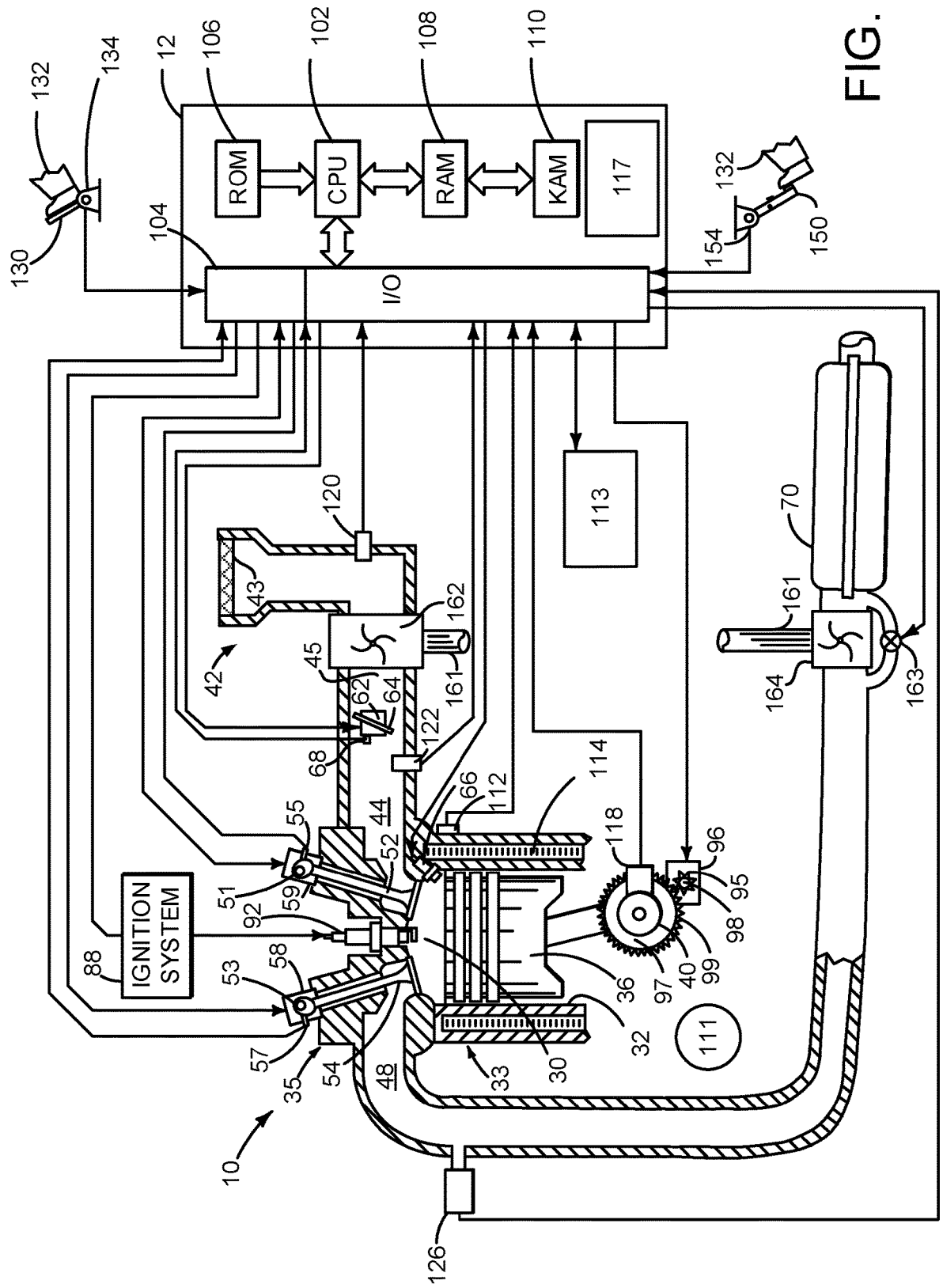
FIG. 1 shows a schematic diagram of one cylinder of an example engine system.
Figure 5:
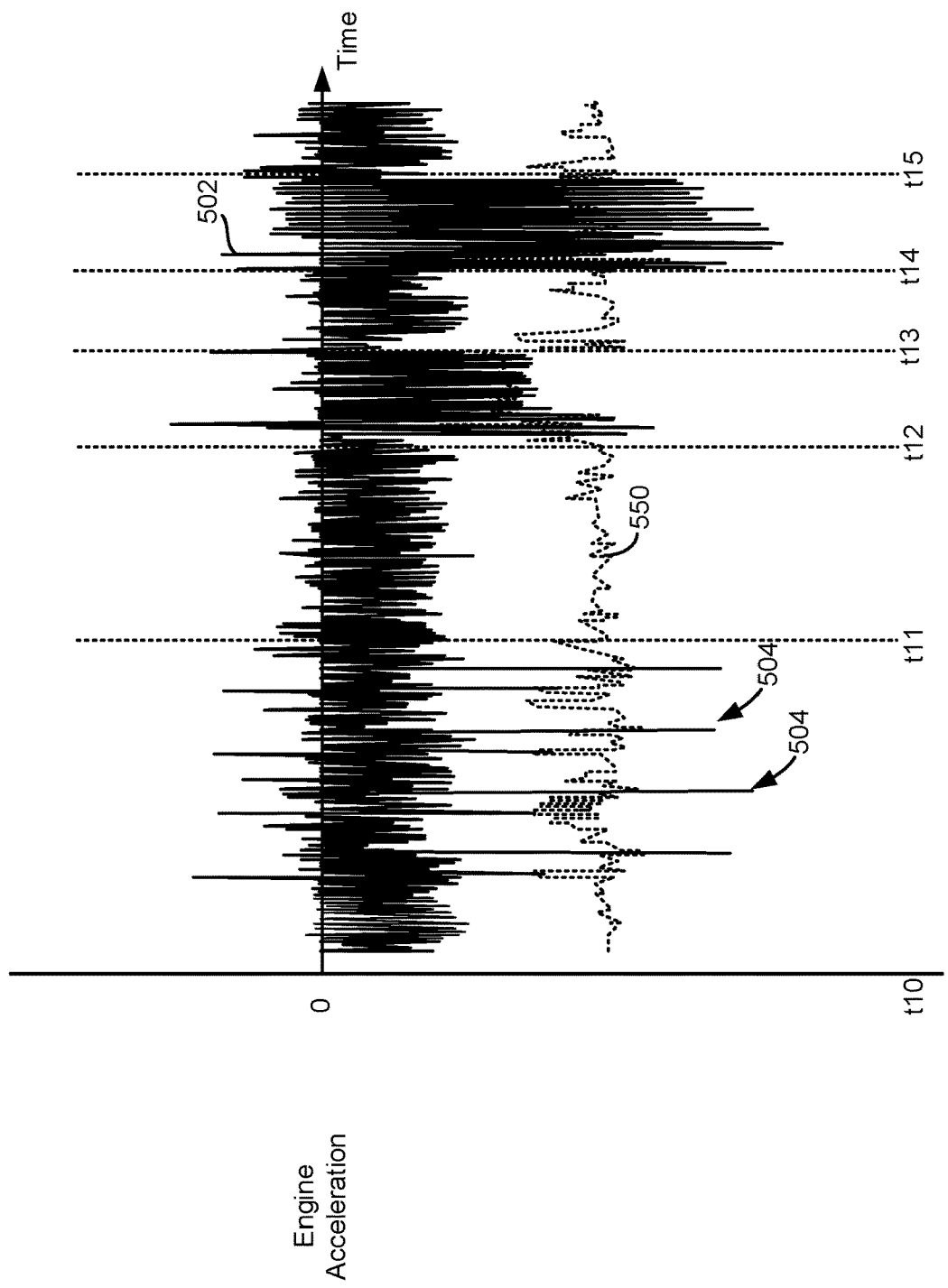
FIG. 5 shows example engine acceleration levels and a dynamic cylinder misfire threshold applied when one or more cylinders of an engine are deactivated.

The present description is related to detecting and mitigating cylinder misfire. Cylinder misfire may be detected or not detected in a spark ignition engine as shown in FIG. 1 or a diesel engine. The engine of FIG. 1 may include cylinders that may be selectively activated and deactivated via actuators of the type shown in FIG. 2 or of other types. The engine may be a V type engine or an inline engine as shown in FIGS. 3A and 3B. Engine acceleration may be compared to a static threshold to determine the presence or absence of cylinder misfire as depicted in FIG. 4 when none of an engine's cylinders are deactivated. Engine acceleration may be may be compared to a dynamic threshold to determine the presence or absence of cylinder misfire as depicted in FIG. 5 when one or more of the engine's cylinders are deactivated. A block diagram in FIG. 6 describes a way of determining the dynamic threshold shown in FIG. 5. A method for operating an engine and determining the presence or absence of cylinder misfire is shown in FIGS. 7 and 8.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. In other examples, integrated starter/generator (ISG) 111 may rotate engine and ISG 111 may be directly coupled to crankshaft 40 or coupled to crankshaft 40 via a belt.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58. Valve actuator devices 58 and 59 may be one of the type shown in FIG. 2 or other known configurations.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42. Throttle 62 is positioned downstream of compressor 162 in the direction of air flow into engine 10.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also communicate with human/machine interface 113. Human/machine interface may receive voice or data input from vehicle occupants or a remote host computer (not shown). Further, controller 12 may include a misfire monitoring unit 117 that receives data from sensors described herein and that may provide an indication of cylinder misfire.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine torque actuators may include throttle 62, fuel injector 66, ignition system 88, waste gate 163, intake valve actuator 59, and exhaust valve actuator 58 since these actuators may be adjusted to increase or decrease engine torque. The engine torque actuators may be adjusted responsive to vehicle operating conditions including a position of accelerator pedal 130.

Figure 2:
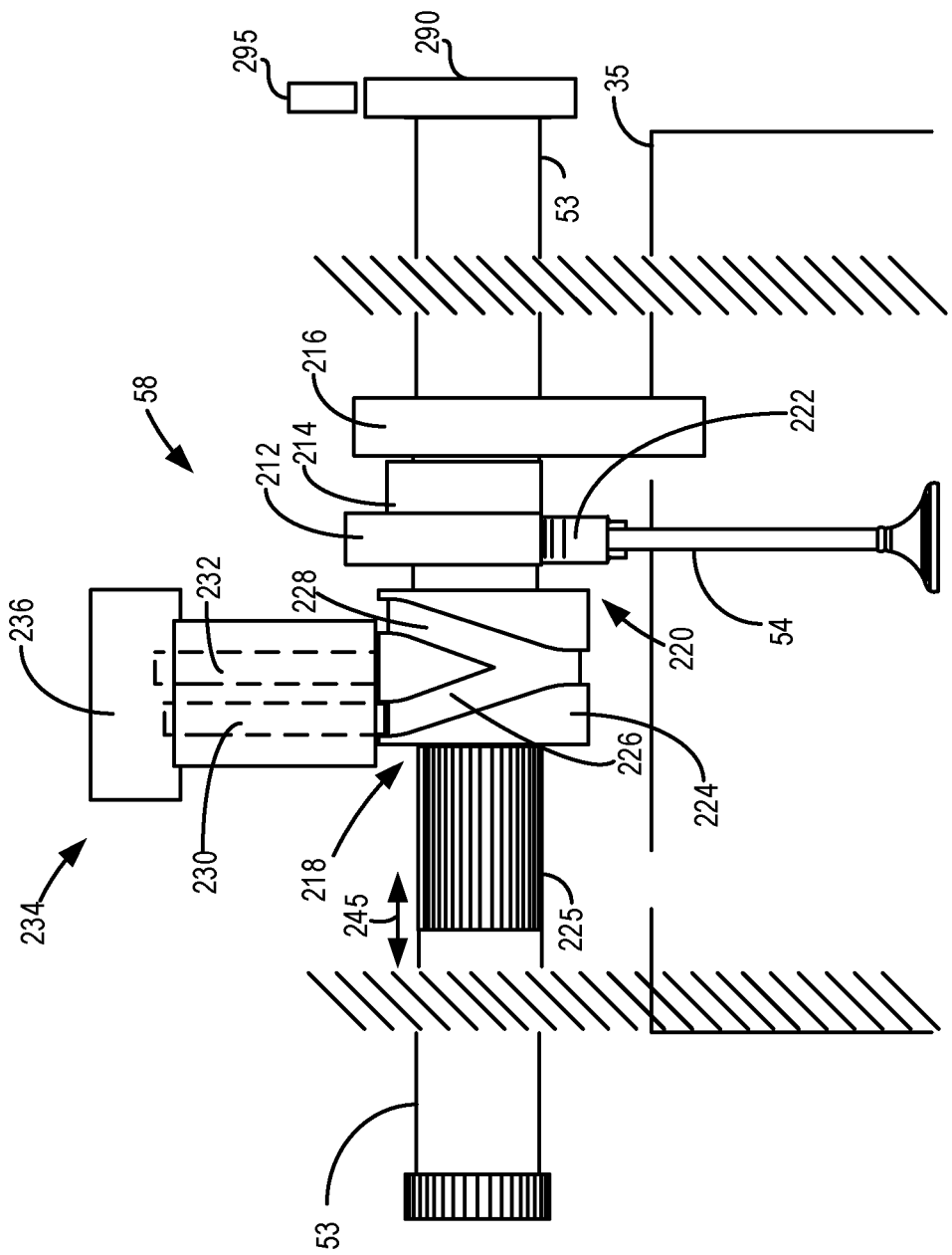
FIG. 2 shows an example cylinder valve activating/deactivating device.
Figure 3A:
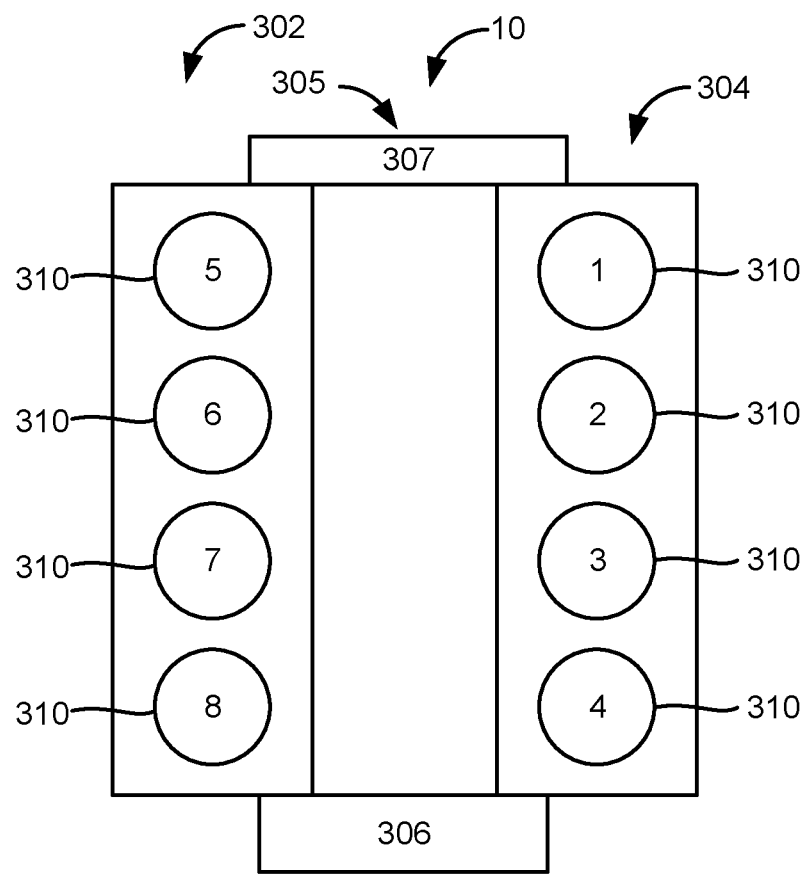
FIGS. 3A-3B show example engine cylinder configurations.
Figure 3B:
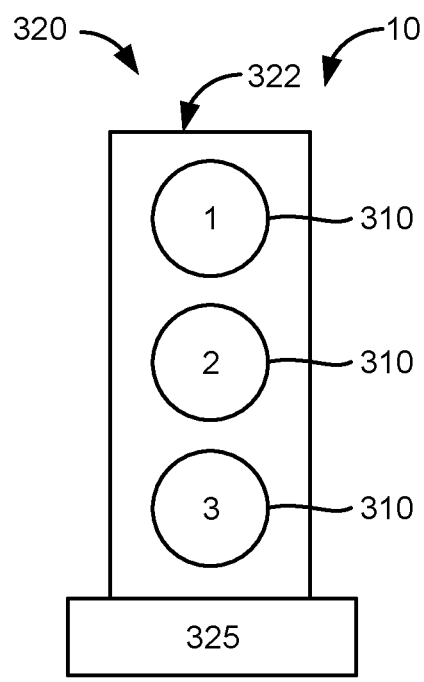

FIG. 2 shows an example cylinder valve actuator 58 for application in engine 10 shown in FIG. 1. Cylinder valve actuator 58 adjusts a lift and/or valve opening duration of a cylinder exhaust valve 54 in response to engine operating conditions. Cylinder valve actuator 58 may provide zero valve lift for one or more engine cycles to deactivate cylinder exhaust valves 54. Exhaust camshaft 53 is shown positioned above a cylinder head 35 of an engine cylinder bank. Exhaust valve 54 is configured to open and close an exhaust port in a cylinder, such as the cylinder shown in FIG.

1. For example, exhaust valve 54 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. Further, a cylinder valve actuator similar to cylinder valve actuator 58 may be applied to engine intake valves. In addition, engine 10 of FIG. 1 may include any number of cylinders with associated valves and a variety of different cylinder and valve configurations may be used, e.g., V-6, I-4, I-3, I-6, V-12, opposed 4, and other engine types.

One or more cam towers or camshaft mounting regions may be coupled to cylinder head 35 to support exhaust camshaft 53. For example, cam tower 216 is shown coupled to cylinder head 35 adjacent to exhaust valve 54. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 54 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 54, may be operated in different lift modes based on engine operating conditions.

Exhaust camshaft 53 may include a plurality of cams configured to control the opening and closing of the exhaust valves. For example, FIG. 2 shows a first cam lobe 212 and a second cam lobe 214 positioned above valve 54. The cams lobes may have different shapes and sizes to form lift profiles used to adjust an amount and timing of a lifting of valve 54 while exhaust camshaft 53 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 53 includes a mechanism 218 coupled to the camshaft above the exhaust valve 54 for adjusting an amount of valve lift for that exhaust valve 54 and/or for deactivating that exhaust valve by changing a location of cam lobes along the camshaft relative to exhaust valve 54. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 54, may be slid across the camshaft in directions indicated by arrow 245 to change a cam lobe profile coupled to the valve follower (e.g., follower 220 coupled to exhaust valve 54) to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to exhaust camshaft 53. Camshaft position relative to the engine crankshaft is determined via rotation sensing camshaft position sensor 295 and exhaust camshaft position indicator 290. Exhaust camshaft 53 may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to exhaust valve 54 in order to change the lift of the exhaust valve 54. For example, sleeve 224 may include one or more displacing grooves (e.g., grooves 226 and 228), which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 54. Sleeve 224 is shown in a first position while pin 232 shifts sleeve 224 to the left side of FIG. 2. Sleeve 224 follows spline 225 in an axial direction along exhaust camshaft 53 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 53 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to exhaust camshaft 53. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Exhaust cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized (e.g., via a current supplied thereto from the control system), a force is applied to both pins to deploy both pins toward the sleeve.

Referring now to FIG. 3A, a first configuration of engine 10 is shown. Engine 10 includes two cylinder banks 302 and 304. First cylinder bank 304 includes cylinders 310 numbered 1-4. Second cylinder bank 302 includes cylinders 310 numbered 5-8. Thus, the first configuration is a V8 engine comprising two cylinder banks. All cylinders operating may be a first cylinder operating mode. Front 305 of engine 10 includes an accessory drive 307, which may include pumps, fans, etc. Transmission 306 is shown coupled to a rear side of engine 10.

During select conditions, one or more of cylinders 310 may be deactivated via ceasing to flow fuel to the deactivated cylinders. Further, air flow to deactivated cylinders may cease via closing and holding closed intake and exhaust valves of the deactivated cylinders, thereby deactivating the intake and exhaust valves while the crankshaft of engine 10 rotates. The engine cylinders may be deactivated in a variety of patterns to provide a desired actual total number of activated or deactivated cylinders. For example, cylinders 2, 3, 5, and 8 may be deactivated forming a first pattern of deactivated cylinders and a second cylinder operating mode. Alternatively, cylinders 1, 4, 6, and 7 may be deactivated forming a second pattern of deactivated cylinders and a third cylinder operating mode. In still another example, cylinders 2 and 8 may be deactivated forming a third pattern of deactivated cylinders and a fourth cylinder operating mode. In yet another example, cylinders 3 and 5 may be deactivated forming a fourth pattern of deactivated cylinders and a fifth cylinder operating mode. In this example, five cylinder operating modes are provided; however, additional or fewer cylinder operating modes may be provided. If engine conditions are such that the engine may operate in any of the five cylinder modes described, the engine may be described as having five available cylinder operating modes. In this example, if two of the engine's five operating modes are not available, the engine may be described as having three available operating modes. The engine always has one available cylinder operating mode (e.g., all cylinders active and receiving air and fuel). Of course, the actual total number of available operating modes may be more than or less than five depending on the engine configuration.

Referring now to FIG. 3B, a second configuration of engine 10 is shown. Engine 10 includes one cylinder bank 322. Cylinder bank 306 includes cylinders 310 numbered 1-3. Thus, the first configuration is an I3 engine comprising one cylinder bank. All cylinders operating may be a first cylinder operating mode for this engine configuration. Cylinder number one is nearest to front of engine 320.

Similar to the first configuration, one or more of cylinders 310 may be deactivated via ceasing to flow fuel to the deactivated cylinders while the engine's crankshaft continues to rotate. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinder 2 may be deactivated forming a first pattern of deactivated cylinders and a second cylinder operating mode. Alternatively, cylinders 3 may be deactivated forming a second pattern of deactivated cylinders and a third cylinder operating mode. The engine always has one available cylinder operating mode (e.g., all cylinders active and receiving air and fuel). Of course, the actual total number of available operating modes may be more than or less than five depending on the engine configuration.

In still other examples, different cylinder configurations may be provided. For example, the engine may be an I4, V6 engine, or a V10 engine. The different engine configurations may also have different numbers of cylinder operating modes.

Thus, the system of FIGS. 1-3B provides for 16. An engine system, comprising: an engine including one or more cylinder valve deactivating mechanisms; an engine position sensor; and a controller including executable instructions stored in non-transitory memory that cause the controller to indicate cylinder misfire and to adjust operation of the engine in response to the indication of cylinder misfire, the indication of cylinder misfire responsive to an engine acceleration being less than a threshold, the threshold based on a median parameter value of activated cylinders and a median parameter value of non-activated cylinders. The engine system further comprises additional instructions to determine the engine acceleration via the engine position sensor. The engine system further comprises a fuel injector. The engine system includes where adjusting operation of the engine includes adjusting operation of the fuel injector. The engine system includes where adjusting operation of the fuel injector includes deactivating the fuel injector.

Referring now to FIG. 4, a plot showing engine acceleration levels for a three cylinder engine operating with one of its cylinders being deactivated or non-active (e.g., not receiving fuel and may not receive air) is shown. FIG. 4 also shows a misfire threshold that is not a function of deactivated cylinder acceleration and active cylinder acceleration (e.g., a static threshold).

The vertical axis represents engine acceleration and engine acceleration increases for positive engine acceleration values that are in the direction of the vertical axis arrow above the horizontal axis. Engine acceleration decreases (e.g., the engine decelerates) for negative engine acceleration values that are in the direction of the vertical axis arrow below the horizontal axis. The engine acceleration value at the level of the horizontal axis is zero. The horizontal axis represents time and time increases from the left side of the plot to the right side of the plot. Vertical lines at time t1 and time t2 indicate times of interest for the plot. The vertical axis and horizontal axis intercept represents time t0. Solid trace 402 represents engine acceleration.

Engine acceleration values may be determined during predefined crankshaft intervals where engine acceleration due to combustion of air and fuel within the engine may be expected to be greatest. For example, if the engine is a four stroke three cylinder engine, engine acceleration may be computed for engine acceleration between top-dead-center compression stroke of cylinder number one to 60 crankshaft degrees after top-dead-center compression stroke of cylinder number one to determine engine acceleration due to combustion in cylinder number one. Engine acceleration may also be computed for engine acceleration between top-dead-center compression stroke of cylinder number three to 60 crankshaft degrees after top-dead-center compression stroke of cylinder number three to determine engine acceleration due to combustion in cylinder number three. Likewise, engine acceleration may be computed for engine acceleration between top-dead-center compression stroke of cylinder number two to 60 crankshaft degrees after top-dead-center compression stroke of cylinder number two to determine engine acceleration due to combustion in cylinder number two. Thus, engine acceleration values may be computed for each cylinder during a cycle of the engine (e.g., two revolutions for a four stroke engine), whether or not the cylinder fires during the engine cycle. The engine acceleration values may be computed via measuring the time it takes for the engine to travel from a first known position (e.g., top-deadcenter compression stroke of cylinder number one) to a second known position (e.g., 60 crankshaft degrees top-dead-center compression stroke of cylinder number one) to determine engine velocity and then computing the derivative of the engine velocity. The derivative of the velocity may be computed by subtracting a second computed engine velocity from a first computed engine velocity and then dividing the result by the time the engine was at the second velocity minus the time the engine was at the first velocity. Controller 12 in cooperation with output of engine position sensor 118 may compute engine acceleration in this way.

Static cylinder misfire threshold 450 may be empirically determined via making threshold 450 lower than the acceleration amounts for cylinders in which combustion occurs during a cylinder cycle when all cylinders are activated. For example, if lower engine acceleration rates for the engine are 3 rev/sec$^2$, then threshold 450 may be adjusted to −5 rev/sec$^2$. An additional margin is included to separate the threshold from the lowest values for combustion since there is some variation in the engine acceleration. Then, if engine acceleration is less than a threshold (e.g., −5 rev/sec$^2$), or alternatively, if the absolute of engine acceleration is less than the absolute value of the threshold, then an indication of cylinder misfire may be provided.

Between time t0 and time t1, the engine is operating with two cylinders being activated and one of its cylinders deactivated and cylinder misfires are purposely introduced on the two activated cylinders. The cylinder misfires may be identified as the negative engine acceleration values having a larger magnitude 404. These engine acceleration values are well below threshold 450. Therefore, an indication of cylinder misfires may be provided for these cylinder crankshaft intervals since they exhibit engine acceleration that is less than that defined by threshold 450. Engine acceleration levels that are less than the level defined by threshold 450 may be recognized as indications of cylinder misfire since combustion of air and fuel did not take place or was incomplete, and therefore, the engine decelerated.

Between time t1 and time t2, the engine is still operating with two cylinders being activated and one of its cylinders deactivated. No cylinder misfires are purposely introduced. It may be observed that although the variation falls short of threshold 450 in this example, the variation is very close to the threshold and there is little separation. This significantly increases the possibility of false positive indications of cylinder misfire.

Thus, for an engine that is receiving air and fuel in each of its cylinders and operating without deactivated cylinders (e.g., cylinders that are not provided fuel and/or spark and that may have intake and exhaust valves held closed over an entire engine cycle), a single threshold 450 for a particular engine speed and load may be useful to detect the presence or absence of cylinder misfire. The threshold 450 may be empirically determined based on engine acceleration values when all cylinders are activated. However, this single threshold may not provide sufficient separation between engine acceleration values when the engine is operating with one or more cylinders deactivated.

Referring now to FIG. 5, another plot showing engine acceleration levels for a three cylinder engine operating with one of its cylinders being deactivated or non-active (e.g., not receiving fuel and may not receive air) is shown. FIG. 5 also shows a misfire threshold 550 that is a function of deactivated cylinder acceleration and active cylinder acceleration (e.g., a dynamic threshold).

The vertical axis represents engine acceleration and engine acceleration increases for positive engine acceleration values that are in the direction of the vertical axis arrow above the horizontal axis. Engine acceleration decreases (e.g., the engine decelerates) for negative engine acceleration values that are in the direction of the vertical axis arrow below the horizontal axis. The engine acceleration value at the level of the horizontal axis is zero. The horizontal axis represents time and time increases from the left side of the plot to the right side of the plot. Vertical lines at times t10-t15 indicate times of interest for the plot. The vertical axis and horizontal axis intercept represents time t10. Solid trace 502 represents engine acceleration.

Figure 6:
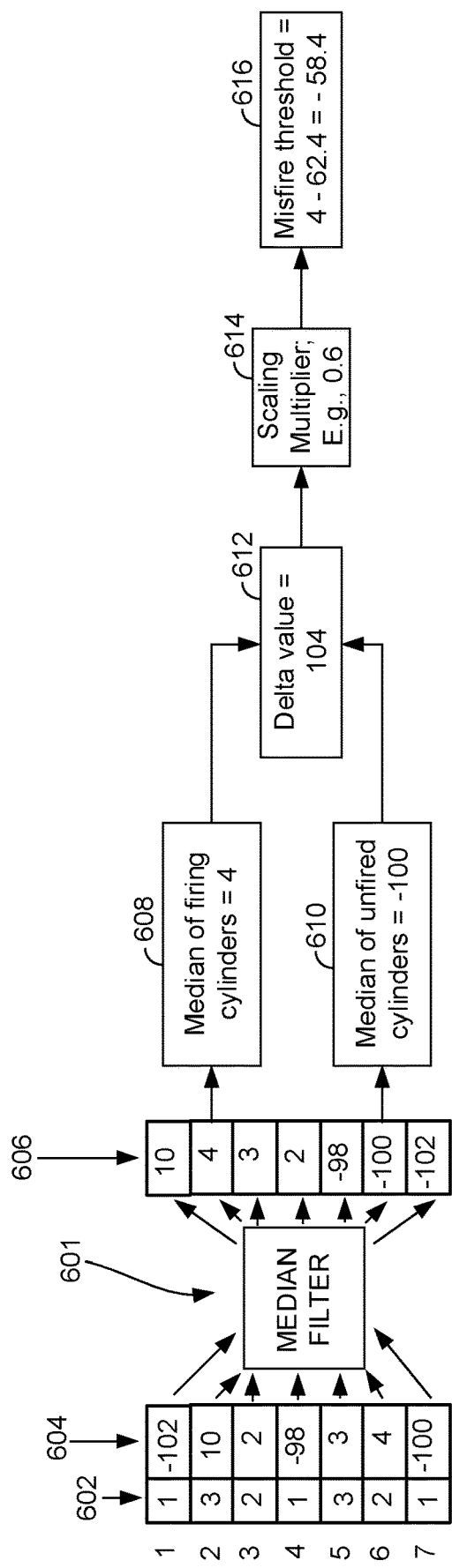
FIG. 6 shows an example block diagram for determining a dynamic cylinder misfire threshold.
Figure 7:
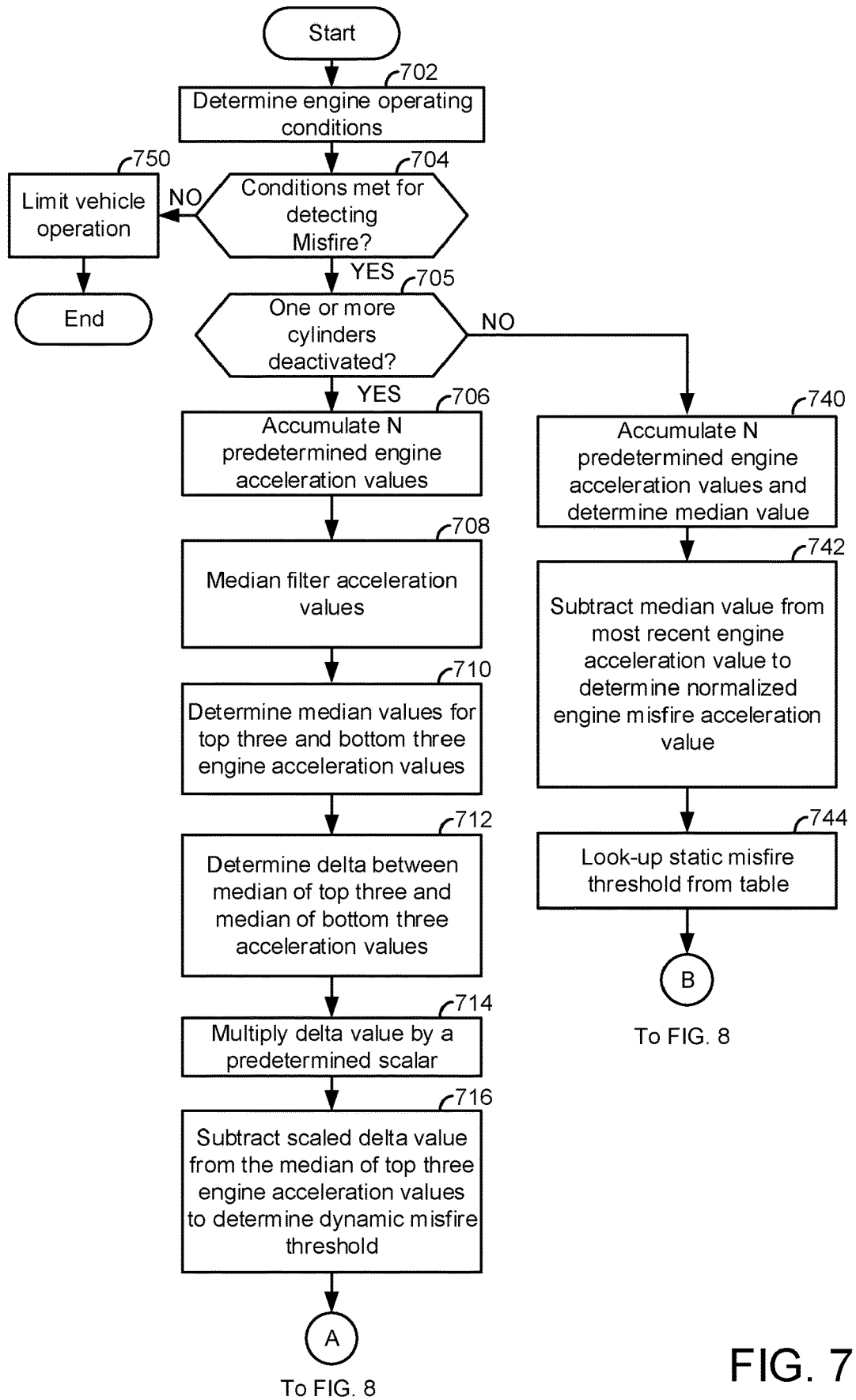

Dynamic cylinder misfire threshold 550 may be determined as a function of engine acceleration of activated and non-activated cylinders as described in FIG. 6 and the method of FIG. 7. The level of dynamic cylinder misfire threshold 550 may change even though engine speed and load are constant.

Between time t10 and time t11, the engine is operating with two cylinders being activated and one of its cylinders deactivated and cylinder misfires are purposefully introduced on the two activated cylinders. The cylinder misfires may be identified as the negative engine acceleration values having a larger magnitude 504. These engine acceleration values are well below threshold 550. Therefore, an indication of cylinder misfires may be provided for these cylinder crankshaft intervals since they exhibit engine acceleration that is less than that defined by threshold 550. Engine acceleration levels that are less than the level defined by threshold 550 may be recognized as indications of cylinder misfire since combustion of air and fuel did not take place or was incomplete, and therefore, the engine decelerated. The cylinder misfires occurring between time t10 and time t11 are separated to represent sporadic cylinder misfire.

Between time t11 and time t12, the engine is operating with two cylinders being activated and one of its cylinders deactivated and there are no cylinder misfires indicated because the engine acceleration values are all greater than threshold 550. It may be observed that although there is some variation of engine acceleration, the variation falls short of threshold 550. Further, the engine acceleration levels are far greater than the engine acceleration levels that indicate cylinder misfire 504. There is also significant separation between engine acceleration values 502 and threshold 550, which may reduce the possibility of false positive indications of cylinder misfire.

Between time t12 and time t13, the engine is operated with one deactivated cylinder and one reoccurring closely timed cylinder misfire. Threshold 550 is dynamically changed in response to engine acceleration being reduced via operating the engine with one deactivated cylinder. Further, threshold 550 is dynamically changed in response to engine acceleration that is a result of misfire. By moving threshold 550 closer to the acceleration exhibited by the engine when all cylinders are activated and combusting, indications of cylinder misfire may be provided each time engine acceleration levels 502 are less than threshold 550.

Between time t13 and time t14, the engine is operating with two cylinders being activated and one cylinder deactivated and there are no cylinder misfires indicated because the engine acceleration values are all greater than threshold 550. The threshold level 550 has been reduced to increase the separation between engine acceleration values 502 and threshold 550, which may reduce false positive indications of cylinder misfire.

Between time t14 and time t15, reoccurring closely timed cylinder misfires are reintroduced on a different activated cylinder (i.e. different cylinder than the cylinder with introduced misfire between time t12 and t13). Because the engine acceleration as a result of misfire is larger on this cylinder (Note: engine response to misfire on the activated cylinders may vary from cylinder to cylinder due to engine rotation dynamics as in this example data) threshold 550 is not increased as it was during the time interval from t12 to time t13. Nevertheless, since engine acceleration values are decreased close to values shown between time t10 and time t11, cylinder misfire may be indicated.

In this way, threshold 550 may dynamically increase or decrease responsive to engine acceleration of deactivated cylinders and engine acceleration of activated cylinders. In particular, engine acceleration of deactivated cylinders may cause threshold 550 to increase so that if misfire occurs in non-deactivated cylinders, then the misfire may be detected even though engine acceleration due to the deactivated cylinder may be lowered.

Referring now to FIG. 6, a block diagram showing how a dynamic cylinder misfire threshold as shown in FIG. 5 may be determined. The structures and operations described here may be incorporated into controller 12 of FIG. 1 as executable instructions.

Engine acceleration values are determined via controller 12 in cooperation with engine position sensor 118 of FIG. 1 are stored in memory locations 604 of controller 12. Engine acceleration values are determined from engine acceleration during predetermined engine crankshaft intervals where the engine may accelerate due to combustion in a particular engine cylinder. For example, engine acceleration values may be computed for engine acceleration occurring between top-dead-center compression stroke of each cylinder and 60 crankshaft degrees thereafter. Thus, if the engine includes three cylinders, engine acceleration may be computed for engine acceleration between top-dead-center compression stroke of cylinder number one to 60 crankshaft degrees after top-dead-center compression stroke of cylinder number one to determine engine acceleration due to combustion in cylinder number one. Engine acceleration may also be computed for engine acceleration between top-dead-center compression stroke of cylinder number two to 60 crankshaft degrees after top-dead-center compression stroke of cylinder number two to determine engine acceleration due to combustion in cylinder number two. Likewise, engine acceleration may also be computed for engine acceleration between top-dead-center compression stroke of cylinder number three to 60 crankshaft degrees after top-dead-center compression stroke of cylinder number three to determine engine acceleration due to combustion in cylinder number three.

In this example, seven engine acceleration values are stored in controller memory and the engine acceleration values are numbered 1-7 (along column 602), where engine acceleration value one is the most recent engine acceleration value and engine acceleration value seven is the oldest engine acceleration value. The total number of engine acceleration values may vary with the actual total number of engine cylinders. In one example, the total number of engine acceleration values is the total number of engine acceleration values computed in two engine cycles (e.g., four engine revolutions for a four cycle engine) plus one additional engine acceleration value. A new engine acceleration value replaces an engine acceleration value stored in memory each time the engine rotates through an engine crankshaft interval for which an engine acceleration value is determined. Cylinder numbers associated with the engine acceleration values are indicated in column 602. Thus, the most recent engine acceleration value determined from engine acceleration data during the power or expansion stroke of cylinder number one is −102. The second most recent engine acceleration value determined from engine acceleration data during the power stroke of cylinder number three is 10, and so on.

Median filter 601 sorts engine acceleration values in memory locations 604 into median filter output memory locations 606 each time a new engine acceleration value is stored to controller memory. Median filter 601 outputs data (e.g., engine acceleration values) to memory 606 arranged from lowest engine acceleration value to highest engine acceleration value. When the engine is operated with one or more deactivated cylinders, the two lowest values (e.g. −102 and −100 in this example) in memory locations 606 represent engine acceleration for deactivated cylinders since the engine does not accelerate due to combustion for deactivated cylinders. The negative values indicate that the engine decelerated during that particular crankshaft interval. The two highest values (e.g. 10 and 4 in this example) in memory locations 606 represent engine acceleration for activated cylinders since the engine accelerates due to combustion for activated cylinders. The positive values indicate that the engine accelerated during that particular crankshaft interval. Thus, memory locations 606 hold the output of median filter 601.

An engine acceleration value for activated cylinders is extracted from memory locations 606 at 608. In particular, a median value of the three entries closest to the top of column 606 is extracted to 608. An engine acceleration value for a deactivated cylinder is extracted from memory locations 606 at 610. Specifically, a median value of the three entries closest to the bottom of column 606 is extracted to 606. The value at 610 is then subtracted from the value at 608 at 612 to provide a delta or difference between the value at 610 and the value at 608. The delta value of 612 is then multiplied by a scalar at 614 (0.6 in this example). The scaler allows the threshold to be set between the acceleration values of deactivated cylinders, which are expected to provide engine acceleration values that are equal to engine acceleration values of misfires where no combustion takes place during a cylinder cycle, and acceleration values of activated cylinders. Scalar values that are closer to a value of one move the threshold toward engine acceleration values when cylinders are deactivated. Scalar values that are closer to zero move the threshold torque engine acceleration values when cylinders are activated. The result of the scalar multiplication at 614 is then subtracted from the value at 608 (e.g., the median acceleration of firing cylinders) to provide the dynamic misfire threshold at 616. The scaled subtraction at 616 normalizes the misfire threshold to zero, which removes a DC offset (e.g., constant offset) from the threshold to provide a consistent threshold level.

Referring now to FIGS. 7 and 8, a method for operating an internal combustion engine including determining the presence or absence of cylinder misfire is described. The method of FIGS. 7 and 8 may be incorporated into and may cooperate with the system of FIGS. 1-3. Further, at least portions of the method of FIGS. 7 and 8 may be incorporated as executable instructions stored in non-transitory memory of a controller while other portions of the method may be performed via a controller transforming operating states of devices and actuators in the physical world. Further, the controller includes executable instructions to operate the engine at the conditions described herein.

At 702, method 700 determines engine operating conditions. Engine operating conditions may be determined from output of the various sensors described herein. Engine operating conditions may include but are not limited to engine operating state, engine speed, engine load, engine temperature, identified active engine cylinders, identified deactivated engine cylinder, and active cylinder pattern. Method 700 proceeds to 704 after engine operating conditions are determined.

At 704, method 700 judges whether or not operating conditions are present for detecting cylinder misfire. Cylinder misfire detection may be activated during most vehicle operation conditions; however, cylinder misfire may be deactivated during select vehicle operating conditions. For example, cylinder misfire detection may be deactivated if the vehicle is traveling over a very rough road since the rough road may affect determination of engine acceleration via vibrations caused by a rough road surface. If method 700 judges that conditions are present for detecting cylinder misfire the answer is yes and method 700 proceeds to 705. Otherwise, the answer is no and method 700 proceeds to 750.

At 750, method 700 may limit vehicle operation. For example, method 700 may limit maximum catalyst temperature by limiting a maximum engine speed. Further, method 700 may limit the engine from entering select operating modes where there may be a higher propensity for cylinder misfire, such as when the engine is operated with a lean air-fuel ratio. Further still, method 700 may take actions to mitigate the possibility of cylinder misfire if conditions are not present for detecting cylinder misfire. For example, method 700 may increase an ignition dwell (e.g., an amount of time an ignition coil is charged) time to increase spark energy to reduce the possibility of cylinder misfire. Method 700 proceeds to exit.

At 705, method 700 judges if one or more engine cylinders is deactivated (e.g., fuel flow is ceased to the cylinder and intake and exhaust valves of the cylinder may be held in a closed state over an entire engine cycle). In one example, method 700 may judge that one or more cylinders are deactivated based on output of valve train position sensor output. In another example, method 700 may judge that one or more cylinders are deactivated based on values of variables stored in controller memory that indicate cylinder operating states. If method 700 judges that one or more cylinders are deactivated, the answer is yes and method 700 proceeds to 706. Otherwise, the answer is no and method 700 proceeds to 740.

At 706, method 700 accumulates and stores to controller memory N (e.g., an integer number) of engine acceleration values determined at predetermined engine crankshaft intervals for each engine cylinder. For example, engine acceleration values may be computed for engine acceleration occurring between top-dead-center compression stroke of each cylinder and 60 crankshaft degrees thereafter. The total number of engine acceleration values may vary with the actual total number of engine cylinders. In one example, the total number of engine acceleration values is the total number of engine acceleration values computed in two engine cycles (e.g., four engine revolutions for a four cycle engine) plus one additional engine acceleration value. An engine acceleration value is computed for a specific engine cylinder once each engine cycle. A new engine acceleration value replaces an engine acceleration value stored in memory each time the engine rotates through an engine crankshaft interval for which an engine acceleration value is determined. Column 604 of FIG. 6 shows example memory locations where a predetermined actual total number of engine acceleration values have been stored in controller memory. Method 700 proceeds to 708.

At 708, method 700 sorts the engine acceleration values from lowest value to highest value as shown at column 606 of FIG. 6 and stores the values in memory in the sorted order. Method 700 proceeds to 710.

At 710, method 700 determines a median value of the top three engine acceleration values (e.g., three greatest engine acceleration values) in the sorted engine acceleration values described at 708. In other examples, the top median value may be determined from a number of values that is different from three. Method 700 also determines a median value of the bottom three engine acceleration values (e.g., three least engine acceleration values) in the sorted engine acceleration values described at 708. In other examples, the bottom median value may be determined from a number of values that is different from three. In this way, method 700 may extract a median engine acceleration value from activated cylinders and a median engine acceleration value from non-activated cylinders. Method 700 proceeds to 712.

At 712, method 700 determines a difference or delta between the median of the top three engine acceleration values and the median of the bottom three engine acceleration values. In one example, the median of the bottom three engine acceleration values is subtracted from the median of the top three engine acceleration values to determine the delta value. Method 700 proceeds to 714.

At 714, method 700 multiplies the delta value from 712 by a predetermined scalar value. The predetermined scalar value may be empirically determined and stored to controller memory. In one example, the predetermined scalar value may range from near zero to one. The scaler allows the threshold to be set between the engine acceleration values of deactivated cylinders, which are expected to provide engine acceleration values that are equal to engine acceleration values of misfires where no combustion takes place during a cylinder cycle, and engine acceleration values of activated cylinders. Scalar values that are closer to a value of one move the threshold toward engine acceleration values when cylinders are deactivated. Scalar values that are closer to zero move the threshold torque engine acceleration values when cylinders are activated. Method 700 proceeds to 716.

At 716, method 700 subtracts the result of the multiplication of the delta value by the scalar at 714 from the top median value determined at 710 to determine a dynamic threshold level for judging the presence or absence of cylinder misfire. Subtracting the result of the multiplication by the delta value from the top median value normalizes the threshold value for engine operating conditions. A new value of the engine threshold acceleration value is determined each time engine acceleration is determined (e.g., each time an engine cylinder travels from its top-dead-center compression stroke to 60 crankshaft degrees thereafter). Method 700 proceeds to 718.

At 718, method 700 judges if a value of the most recent engine acceleration is greater than (e.g., G.T.) the value of the dynamic engine acceleration threshold determined at 716. If so, the answer is yes and method 700 proceeds to 719. Otherwise, the answer is no and method 700 proceeds to 720.

At 720, method 700 indicates a presence of cylinder misfire and adjusts engine actuators to mitigate engine misfire. In one example, cylinder misfire may be indicated to vehicle occupants via a human/machine interface. In other examples, cylinder misfire may be broadcast to a vehicle service center. Method 700 may also deactivate an engine cylinder via ceasing fuel flow to the cylinder for which misfire is indicated if the frequency of cylinder misfire is greater than a threshold. Thus, the fuel injector of the cylinder may be deactivated. Further, intake and exhaust valves of the cylinder may be held in closed positions to prevent entry of air into the deactivated cylinder. In still other examples, spark energy may be increased and/or fuel amount supplied to a cylinder may be richened if the cylinder is operating lean and misfiring. Method 700 proceeds to exit after indicating cylinder misfire and performing mitigation efforts.

At 719, method 700 does not indicate cylinder misfire for the present cylinder cycle. Further, method 700 may clear an indication of cylinder misfire for a cylinder that has misfired previously. Method 700 proceeds to exit.

At 740, method 700 accumulates and stores to controller memory N of engine acceleration values determined at predetermined engine crankshaft intervals for each engine cylinder. Then method 700 determines the median value of the N engine acceleration values. Method 700 proceeds to 742.

At 742, method 700 subtracts the median value determined at 740 from the most recently determined engine acceleration value to determine the normalized engine acceleration for the most recent crankshaft interval for which engine acceleration is determined. Method 700 proceeds to 744.

At 744, method 700 looks up a misfire threshold from a table or function stored in controller memory. The values in the table or function may be empirically determined by monitoring engine acceleration while engine misfire is forcibly introduced. Method 700 proceeds to 746.

At 746, method 700 judges if the normalized engine acceleration determined at 742 is greater than (e.g., G.T.) the value of the static engine acceleration threshold determined at 744. If so, the answer is yes and method 700 proceeds to 749. Otherwise, the answer is no and method 700 proceeds to 748.

At 748, method 700 indicates a presence of cylinder misfire and adjusts engine actuators to mitigate engine misfire. In one example, cylinder misfire may be indicated to vehicle occupants via a human/machine interface. In other examples, cylinder misfire may be broadcast to a vehicle service center. Method 700 may also deactivate an engine cylinder via ceasing fuel flow to the cylinder for which misfire is indicated if the frequency of cylinder misfire is greater than a threshold. Thus, the fuel injector for the cylinder may be deactivated. Further, intake and exhaust valves of the cylinder may be held in closed positions to prevent entry of air into the deactivated cylinder. In still other examples, spark energy may be increased and/or fuel amount supplied to a cylinder may be richened if the cylinder is operating lean and misfiring. Method 700 proceeds to exit after indicating cylinder misfire and performing mitigation efforts.

At 749, method 700 does not indicate cylinder misfire for the present cylinder cycle. Further, method 700 may clear an indication of cylinder misfire for a cylinder that has misfired previously. Method 700 proceeds to exit.

In this way, cylinder misfire may be judged based on a static threshold or a dynamically changing threshold. The dynamically changing threshold may be used to identify cylinder misfire by applying engine acceleration values for non-activated or deactivated cylinders, which provide engine acceleration for a misfiring cylinder.

Thus, the method of FIGS. 7 and 8 provides for 1. An engine operating method, comprising: determining engine acceleration is less than a threshold, indicating misfire in an engine cylinder, the indication of misfire provided in response to an engine acceleration value being less than a threshold, the threshold being a function of a first group of parameters for activated cylinders and a second group of parameters for deactivated cylinders; and adjusting operation of a device in response to the indication of misfire. The method includes where the device is a fuel injector. The method includes where the device is a human/machine interface. The method includes where the first group of parameters is comprised of engine crankshaft acceleration values. The method includes where the second group of parameters is comprised of engine crankshaft acceleration values. The method includes where the first group of parameters and the second group of parameters are extracted from a memory queue comprised of engine acceleration values from a predetermined actual total number of most recent cylinder specific crankshaft intervals. The method further comprises determining median values for the first group of parameters and the second group of parameters. The method further comprises determining a difference between the median value of the first group of parameters and the median value of the second group of parameters. The method further comprises scaling the difference and subtracting the scaled difference from a value in the first group of parameters to determine the threshold.

The method of FIGS. 7 and 8 also provides for an engine operating method, comprising: detecting a parameter value for a first group of activated cylinders and a parameter value for a second group of non-activated cylinders; collating data collected from the first group of activated cylinders and a second group of non-activated cylinders into two separate pools; performing a first set of calculations to determine a reference value from the median parameter value of the second group of non-activated cylinders; performing a second set of calculations to determine a threshold value using data collected from the first group of activated cylinders and the reference value determined from first set of calculations; and providing the calculated threshold value obtained from the second set of calculations to a monitor unit directed to determine misfire event detection. The method includes where the parameter value of the first group of activated cylinders is a value of engine acceleration. The method includes where the parameter value of the second group of non-activated cylinders is a value of engine acceleration. The method includes where the monitor unit is included in a controller, and where collating data from the first group of activated cylinders includes arranging the data in order from least values to greatest values. The method further comprises comparing an engine acceleration value to the calculated threshold and indicating cylinder misfire when an engine acceleration value is less than a calculated threshold. The method further comprises adjusting operation of a device via a controller in response to the indication of cylinder misfire.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
indicating misfire in an engine cylinder, the indication of misfire provided in response to an engine acceleration value being less than a threshold, the threshold being a function of a first group of parameters for activated cylinders and a second group of parameters for deactivated cylinders;
determining median values for the first group of parameters and the second group of parameters;
determining an inter-group difference between a median value of the first group of parameters and a median value of the second group of parameters to determine the threshold; and
adjusting operation of a device in response to the indication of misfire.

2. The method of claim 1, where the device is a fuel injector.

3. The method of claim 1, where the device is a human/machine interface.

4. The method of claim 1, where the first group of parameters is comprised of engine crankshaft acceleration values.

5. The method of claim 1, where the second group of parameters is comprised of engine crankshaft acceleration values.

6. The method of claim 1, where the first group of parameters and the second group of parameters are extracted from a memory queue comprised of engine crankshaft acceleration values from a predetermined actual total number of most recent cylinder specific crankshaft intervals.

7. The method of claim 6, further comprising scaling the inter-group difference and subtracting a scaled inter-group difference from the median value of the first group of parameters to determine the threshold.

8. An engine operating method, comprising:
detecting a plurality of engine accelerations in a first group of activated cylinders and a plurality of engine accelerations of a second group of non-activated cylinders;
determining a first median engine acceleration of the first group and a second median engine acceleration of the second group;
calculating a difference between the first median engine acceleration and the second median engine acceleration;
calculating a scaled multiplication value by multiplying the difference by a scalar, wherein the scalar is equal to values between zero and one;
setting a dynamic threshold level equal to a difference between the first median engine acceleration and the scaled multiplication value.

9. The method of claim 8, further comprising comparing an engine acceleration value to the dynamic threshold level, wherein a misfire is indicated when the engine acceleration value is less than the dynamic threshold level.

10. The method of claim 9, further comprising indicating a presence of a cylinder misfire to a human/machine interface or to a vehicle service center.

11. The method of claim 9, further comprising adjusting engine actuators in response to a cylinder misfire, wherein the adjusting comprises ceasing fuel flow to a cylinder for which misfire is indicated if a frequency of the cylinder misfire is greater than a threshold frequency, wherein ceasing fuel flow comprises deactivating a fuel injector of the cylinder.

12. The method of claim 11, wherein the adjusting further comprises holding the intake and exhaust valves of the cylinder in closed positions.

13. The method of claim 11, wherein the adjusting further comprises increasing a spark energy or increasing an amount of fuel supplied to the cylinder if the misfire occurred during a lean operation.

14. An engine system, comprising:
an engine including one or more cylinder valve deactivating mechanisms;
an engine position sensor; and
a controller including executable instructions stored in non-transitory memory that cause the controller to indicate cylinder misfire and to adjust operation of the engine in response to the indication of cylinder misfire, the indication of cylinder misfire responsive to an engine acceleration value being less than a threshold, the threshold based on a difference between a median parameter value of activated cylinders and a scaled difference, wherein the scaled difference is equal to a scalar multiplied to a difference between the median parameter value of activated cylinders and a median parameter value of non-activated cylinders.

15. The engine system of claim 14, further comprising additional instructions to determine the engine acceleration via the engine position sensor.

16. The engine system of claim 14, further comprising a fuel injector.

17. The engine system of claim 16, where adjusting operation of the engine includes adjusting operation of the fuel injector.

18. The engine system of claim 17, where adjusting operation of the fuel injector includes deactivating the fuel injector.

* * * * *